United States Patent
Cheng

(10) Patent No.: US 6,465,976 B1
(45) Date of Patent: Oct. 15, 2002

(54) CONTROLLING DEVICE FOR DC MOTOR SPEED VARIATION

(75) Inventor: Chi-Yuan Cheng, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 09/861,608

(22) Filed: May 22, 2001

(51) Int. Cl.$^7$ .................................................. H02P 1/04
(52) U.S. Cl. ........................ 318/430; 318/139; 388/801; 361/23
(58) Field of Search ................................. 318/139, 430, 318/493, 257, 268; 388/801; 361/23, 29, 31

(56) References Cited

U.S. PATENT DOCUMENTS 4,008,423 A * 2/1977 Christiansen et al. ........ 318/139
5,761,018 A * 6/1998 Blakely ....................... 318/430

* cited by examiner

Primary Examiner—Khanh Dang
(74) Attorney, Agent, or Firm—Rosenberg, Klein & Lee

(57) ABSTRACT

A controlling device for a DC motor speed variation including a power supply circuit, a pair of relays and an interlock circuit for alleviating shock arising from the initiation and termination of a DC motor operation. The controlling device protects the DC motor from catastrophic failure through a sudden variation of the armature current. The controlling device interlocks the direction of the motor rotation while simultaneously providing over current protection for the DC motor.

4 Claims, 1 Drawing Sheet

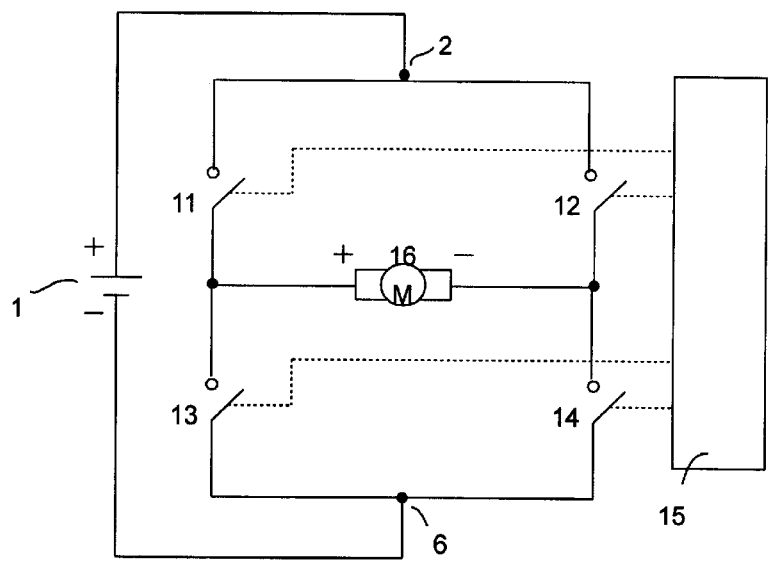
PRIOR ART FIG. 1
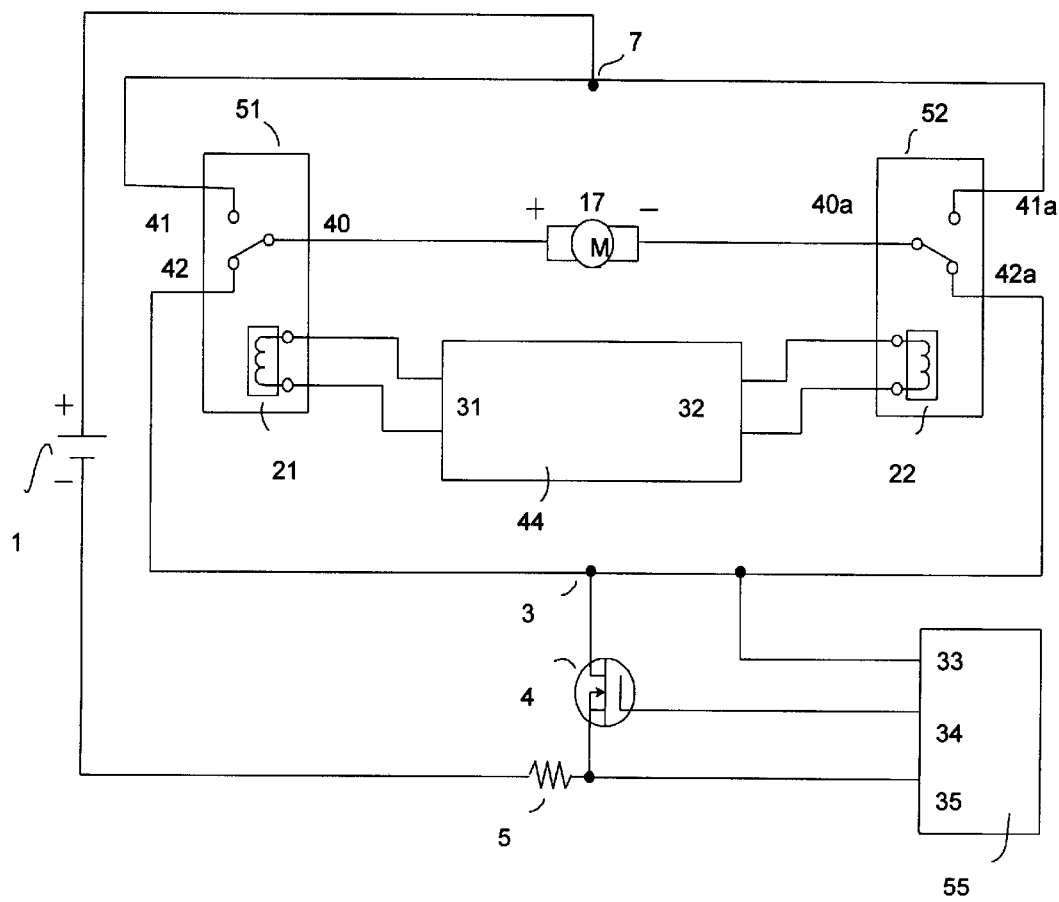
FIG. 2

CONTROLLING DEVICE FOR DC MOTOR SPEED VARIATION

BACKGROUND OF THE INVENTION

1. Field of the Invention

The present invention relates to controlling device for DC motor speed variation, particularly, to a controlling device for DC motor speed variation which can alleviate shock arising from starting and stopping of a DC motor to protect it from rapturing by sudden variation of the armature current, and also able to interlock direction of motor rotation, at the same time, it is able to provide overcurrent protection for the DC motor.

2. Description of the Prior Art

FIG. 1 is a control circuit diagram for a conventional controlling device for DC motor speed variation. As shown in FIG. 1, the (+) input terminal of a DC motor 16 is connected to two relays 11 and 13, whereas its (−) input terminal is connected to relays 12 and 14. The normally open points of the relays 11 and 12 are both connected to a contactor 2 which is further connected to the (+) terminal of a power supply circuit 1. On the other hand, a common point of the relays 13 and 14 is connected to another contactor 6 which is further connected to the (−) terminal of the power supply circuit 1. All four relays 11, 12, 13, 14 are controlled by a common control circuit 15 for operation, Meanwhile, the contact points of the relays 11, 12, 13, 14 are opened when they are de-energized.

In the above described conventional circuit, if it is intended to drive the DC motor 16 to rotate in normal direction, the control circuit 15 energizes the relays 11 and 14 to close their contact points thereby a current flows from the (+) terminal of the power supply circuit 1 to the (−) terminal thereof by way of the contactor 2, and the initially normally open point (now closed) of the relay 11, (+) terminal and (−) terminal of the DC motor 16, the relay 14, and the contactor 6 therefore forming a complete electrical circuit for the current to circulate so as to enable DC motor 16 to rotate in normal direction. If it is intended to stop the DC motor 16, the control circuit 15 actuates the relays 11 and 14 to restore their initial state by opening their contact points so as to interrupt the power supply to the DC motor 16. However, the DC motor 16 can not stop instantly owing to its inertia. Besides, if it is intended to drive the DC motor 16 in reversed direction, the control circuit 15 energizes the relays 12 and 13 to close their contact points, at this time the current flows from the (+) terminal of the power supply circuit 1 to the (−) terminal of the circuit 1 thereof, by way of the contactor 2, the initially normally open point (now closed) of the relay 12, (−) terminal of the DC motor 16, the (+) terminal of the DC motor 16, the relay 13, and the contactor 6 therefore forming a complete electrical circuit for the current to circulate so as to enable the DC motor 16 to rotate in reversed direction.

Owing to the fact that the rotational direction of the DC motor 16 is controlled by only on/off operation of the relays 11, 12, 13 and 14, instantaneous on/off operation of them for starting or stopping the DC motor 16 is sure to irritate a heavy sparking at their contact points by an transient current produced in the circuit resulting in shortening the lifetime of the relays 11, 12, 13 and 14. Further to this, when the DC motor 16 suddenly ceases rotating, the sparking at the open contact points of the relays caused by an induced back emf of the DC motor 16 will likely ruin the contact points. Besides, there is no provision of overload protection means for this system, nor provision of device for constant supervision of current during operation of the DC motor 16 resulting in lack of electric security.

Aiming at the above depicted shortcomings, the present invention it to propose a newly developed controlling device for DC motor speed variation capable of operating the DC motor securely.

SUMMARY OF THE INVENTION

It is an object of the present invention to provide controlling device for DC motor speed variation which can alleviate shock arising from starting and stopping of a DC motor to protect it from rapturing by sudden variation of the armature current.

It is another object of the present invention to provide controlling device for DC motor speed variation which can offer interlocking means for motor rotational direction.

It is still another object of the present invention that this control device is able to provide overcurrent protection for the DC motor.

To achieve these and other objects mentioned above, the controlling device for DC motor speed variation essentially comprises a power supply circuit, two relays, and an interlock circuit. Wherein the power supply circuit is for providing a DC power source; each of the two relays includes an exciting coil, a common point, a normally closed point, and a normally open point, before energizing the exciting coil, the common point is communicated with the normally closed point, but is not communicated with the normally open point, after the exciting coil is energized, the common point is communicated with the normally open point, but is not communicated with the normally closed point. The interlock circuit includes two output terminals each of them being connected to the exciting coil of one of the two relays respectively, the exciting coil is energized when the output terminal is energized, but the two output terminals are never energized simultaneously. The two input terminals of the DC motor are respectively connected to the common points of both relays, and the two normally closed points of both relays are connected to one terminal of the power supply circuit, whereas the two normally open points of both relays are connected to the other terminal of the power supply circuit.

Further to this, an electronic switch is connected to the power supply circuit, this electronic switch is actuated by a starting control circuit capable of delaying actuating time for the electronic switch. Besides, a current detecting circuit is provided for the power supply circuit for detecting whether the motor is over loaded.

BRIEF DESCRIPTION OF THE DRAWINGS

To enable a further understanding of the innovative and technological content of the invention herein, refer to the detailed description of the invention and the accompanying brief description of the drawing appended below in which:

FIG. 1 is a control circuit diagram for a conventional controlling device for DC motor speed variation.

FIG. 2 is a control circuit diagram for the controlling device for DC motor speed variation according to the present invention.

DETAILED DESCRIPTION OF THE PREFERRED EMBODIMENT

Referring to FIG. 2, the drawing shows a control circuit diagram for the controlling device for Dc motor speed variation according to the present invention. As shown in FIG. 2, the (+) terminal of a DC motor 17 is connected to a common point 40 of a relay 51, whereas the (−) terminal of the DC motor 17 is connected to a common point 40 a of another relay 52. A normally open point 41 of the relay 51 and the normally open point 41a of the relay 52 are connected together to a contactor 7 before being connected to the (+) terminal of a power supply circuit 1 via a contactor 7, on the other hand, a normally closed point 42 of the relay 51 and a normally closed point 42a of the relay 52 is connected together to a common contactor 3 which is connected with an electronic switch 4, and the electronic switch 4 is in series with a current detecting circuit 5, and then the connection returns to a (−) terminal of the power supply circuit 1. Meanwhile, each relay 51 or 52 is respectively equipped with an exciting coil 21 or 22. The normally open point 41 of the relay 51 is communicated with the common point 40 when the exciting coil 21 is energized, whereas the normally closed point 42 of the relay 51 is communicated with the common point 40 when the exciting coil 21 is de-energized. The normally open point 41a of the relay 52 is communicated with the common point 40a when the exciting coil 22 is energized, whereas the normally closed point 42a of the relay 52 is communicated with the common point 40a when the exciting coil 22 is de-energized. An interlock circuit 44 has two output terminals 31 and 32 which are respectively connected to the coils 21 and 22 of relays 51 and 52 such that the coils 21 and 22 are energized when the output terminals 31 and 32 are energized. The interlock circuit 44 allows only one output terminal 31 or 32 to be energized at a defined time interval.

A starting control circuit 55 includes a voltage detecting terminal 33, and ON/OFF control terminal 34, and current feedback terminal 35. The voltage detecting terminal 33 is connected to the normally closed points 42 and 42a of the relays 51 and 52. The ON/OFF control terminal 34 is for controlling ON/OFF of the electronic switch 4. The current feedback terminal 35 is connected to the current detecting circuit 5.

In case it is intended to drive the DC motor 17 in normal direction, by energizing the terminal 31 of the interlock circuit 44 so as to energize the coil 21 of the relay 51 and communicate the common point 40 with the normally open point 41, at the same time, by de-energizing the terminal 32 of the interlock circuit 44 so as to de-energize the coil 22 of the relay 52 and communicate the common point 40a with the normally closed point 42a. In this state, a current flows from the (+) terminal of the power supply circuit 1 to the (+) terminal of the DC motor 17 by way of the contactor 7, the normally open point 41 of the relay 51, and the common point 40, and flows from the (−) terminal of the DC motor 17 to the contactor 3 by way of the common point 40a and the normally closed point 42a of the relay 52. At this moment the potential at the contactor 3 is equal to that at the (+) terminal of the power supply circuit 1. As the voltage detecting terminal 33 of the starting circuit 55 is connected to the contactor 3 so that the voltage detected at the terminal 33 is equal to that of the (+) terminal of the power supply circuit 1. At this time the current feedback terminal 35 of the starting circuit 55 is kept at the same potential level as that of the (−) terminal of the power supply circuit 1 as there is no current flowing through the current detecting circuit 5 to cause a voltage drop therefore there is a voltage difference between the voltage detecting terminal 33 and the current feedback terminal 35. As soon as the starting circuit 55 has detected this signal of voltage difference, the ON/OFF control terminal 34 delays actuation of the electronic switch 4 such that current flows through the electronic switch 4 and the current detecting circuit 5 back to the (−) terminal of the power supply circuit 1 thereby completing a circuit for the DC motor 17 to rotate in normal direction. In this version, the operation of the electronic switch 4 is delayed by the ON/OFF control terminal 34 after completion of relay operation so that an immense momentary starting current of the DC motor is alleviated thus protecting contactors of the relays 51 and 52 from rapturing.

On the other hand, in case there happens an overload, the inherent resistance contained in the current detecting circuit 5 produces a large voltage drop thereon sufficient to feedback from the motor 17 or the current feedback terminal 35 of the starting circuit 55 to monitor. If the current exceeds the prescribed monitoring value, the electronic switch 4 is switched off by the ON/OFF control terminal 34 so as to interrupt overcurrent thereby protecting the DC motor 17 and the relays 51, 52 from rapturing.

In case it is intended to stop driving the DC motor 17, at first an instruction to switch off the electronic switch 4 is delivered from the ON/OFF control terminal 34, and then the relays 51 and 52 are restored their initial state by the interlock circuit 44 so as to eliminate possibility of rapturing of relays 51 and 52 due to a high back emf induced by the DC motor 17 from its sudden stopping.

If it is intended to reverse rotating direction of the DC motor 17, by energizing the output terminal 32 of the interlock circuit 44 so as to provide an exciting voltage for energizing the exciting coil 22 of the relay 52 and communicate the common point 40a with the normally open point 41a, at the same time de-energizing the output terminal 31 of the interlock circuit 44 so that the exciting coil 21 of the relay 51 can not be energized, and communicate the common point 40 with the normally closed point 42. At this moment current flows from the (+) terminal of the power supply circuit 1 to the (−) terminal of the DC motor 17 by way of the contactor 7, normally open point 41a of the relay 52, and the common point 40a, and again flows from the (+) terminal of the DC motor 17 to the contactor 3 by way of the common point 40 and the normally closed point 42 of the relay 51. Meanwhile the contactor 3 and the (+) terminal of the power supply circuit 1 are at equal potential level, the voltage detecting terminal 33 of the starting control circuit 55 detects this voltage to delay actuation of the electronic switch 4 through the ON/OFF control terminal 34 so that the electronic switch 4 is in ON state. At this time current flows back to (−) terminal of the power supply circuit 1 via the electronic switch 4 and the current detecting circuit 5 thereby completing an electrical circuit. For the DC motor 17, current flows into its (−) terminal and flows out of its (+) terminal thereby providing a reverse rotation circuit.

Since current monitoring for the DC motor 17 can be carried out during its operation, an immense momentary current caused by sudden starting or stopping of the DC motor 17 can be effectively prevented thereby protecting the DC motor 17 and the relays 51, 52 from rapturing.

It is understood from the above description that the controlling device of the present invention has several noteworthy advantages which the conventional controllers do not have, those are: 1. alleviating shock arising from abrupt starting and stopping of a DC motor to protect it from rapturing by sudden variation of the armature current; 2. providing interlocking means for motor rotational direction; 3. providing overcurrent protection for the DC motor.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A controlling device for DC motor speed variation comprising a power supply circuit, two relays, and an interlock circuit, wherein said power supply circuit is for providing a DC power source;

each of said two relays includes an exciting coil, a common point, a normally closed point, and a normally open point, before energizing said exciting coil, said common point is communicated with said normally closed point, but is not communicated with said normally open point, after said exciting coil is energized, said common point is communicated with said normally open point, but is not communicated with said normally closed point;

said interlock circuit includes two output terminals each of them being connected to said exciting coil of one of said two relays respectively, said exciting coil is energized when said output terminal is energized, but said two output terminals are never energized simultaneously;

two input terminals of said DC motor are respectively connected to the common points of said both relays, and said two normally closed points of said both relays are connected to one terminal of said power supply circuit, whereas said two normally open points of said both relays are connected to the other terminal of said power supply circuit.

2. The controlling device of claim 1, wherein an electronic switch is connected in series with said power supply circuit.

3. The controlling deice of claim 2, wherein said electronic switch is actuated by a starting control circuit capable of delaying actuating time for said electronic switch.

4. The controlling device of claim 1, wherein a current detecting circuit is provided for said power supply circuit for detecting whether said DC motor is overloaded.

* * * * *